United States Patent [19]

Sterling

[11] Patent Number: 4,493,996

[45] Date of Patent: Jan. 15, 1985

[54] SEMICONDUCTOR SWITCH DEVICE

[75] Inventor: Henley F. Sterling, Great Dunmow, England

[73] Assignee: ITT Industries, Inc., New York, N.Y.

[21] Appl. No.: 394,341

[22] Filed: Jul. 1, 1982

[30] Foreign Application Priority Data

Jul. 2, 1981 [GB] United Kingdom ................. 8120464

[51] Int. Cl.[3] ................................................ G02B 5/14

[52] U.S. Cl. .................................... 250/227; 250/215; 200/61.02; 335/151; 335/154

[58] Field of Search ............................... 250/215, 227; 200/61.02; 335/151, 152, 153, 154

[56] References Cited

U.S. PATENT DOCUMENTS 2,875,348 2/1959 Kazan .............................. 200/61.02

*Primary Examiner*—David C. Nelms

*Assistant Examiner*—Ernest Austin, II

*Attorney, Agent, or Firm*—James B. Raden; William J. Michals

[57] ABSTRACT

An electrical contact unit comprises a flexible semiconductor, e.g. silicon, filament carrying contacts and having a shorted pn junction. The filament is mounted in a magnetic field. When light is directed on to the junction, e.g. from an optical fiber, the induced photo current flowing around the short circuit interacts with the magnetic field so as to bend the filament so as to establish connection with one or more adjacent fixed contacts.

5 Claims, 2 Drawing Figures

SEMICONDUCTOR SWITCH DEVICE

BACKGROUND OF THE INVENTION

1. Field of the Invention

This invention relates to electrical switches, and in particular to switches in which the actuating element is movable in response to an applied electro-magnetic signal.

2. Description of the Prior Art

Electro-magnetically operated relays are widely used in a variety of switching applications. Typically such relays are of the electro-mechanical type in which one or more contacts are actuated via a solenoid and armature arrangement. While such devices are extremely reliable, their multipart construction involves relatively high manufacturing costs and the necessary solenoid current required to operate the contacts results in a power dissipation that is both wasteful and costly. Furthermore, as it is difficult to manufacture solenoids that are both very small and efficient, a high packing density of such relays, e.g. for telecommunications switching applications, cannot be achieved. Attempts to overcome these problems have resulted in the introduction of the reed contact switch in which a pair of flexible magnetic contact blades are operated by a surrounding solenoid. However, while the reed switch goes some way to reducing size and manufacturing costs, it still suffers from the disadvantage of power dissipation.

SUMMARY OF THE INVENTION

The object of the invention is to provide a contact unit that is relatively small and does not suffer from the aforementioned power dissipation.

According to the invention there is provided an electrical contact unit, including a movable member carrying one or more contacts and provided with a pn junction, and shorting means connected across said junction, the unit being such that, when electro-magnetic radiation is directed on to said junction in the presence of a magnetic field, an induced current circulates between said junction and shorting means so as to interact with the field and cause deflection of the member thereby making and/or breaking said contacts.

According to a further aspect of the invention there is provided an opto-electrical switch device, including a housing, a flexible semiconductor member mounted within the housing and carrying one or more movable contacts, a pn junction region formed in the semiconductor member and provided with a short circuit path, one or more fixed contacts mounted in the housing in register with the movable contacts, means for providing a magnetic field at least in the region of said junction, and means for directing light on to said junction so as to generate a current flowing from the junction around the short circuit path, and wherein the magnetic field and the magnetic field associated with the short current are mutually orientated such that said filament is caused to bend thereby making and/or breaking said contacts.

The magnetic field required in the operation of the contact unit is advantageously provided by a permanent magnet thus obviating the need for an electro-magnet with its associated power dissipation. The electro-magnetic radiation will, in general, be in the visible portion of the spectrum, or in the adjacent infrared and ultraviolet portions. The pn junction region of the semiconductor body is fabricated in the manner of a conventional junction solar cell but the junction is provided with a short circuit path so that, when the junction is illuminated, an electric current circulates immediately adjacent the junction. The magnetic field associated with this short circuit current interacts with the applied magnetic field to introduce a deflecting force on the semiconductor body according to Faraday's motor rule.

DESCRIPTION OF THE INVENTION

Figure 1:
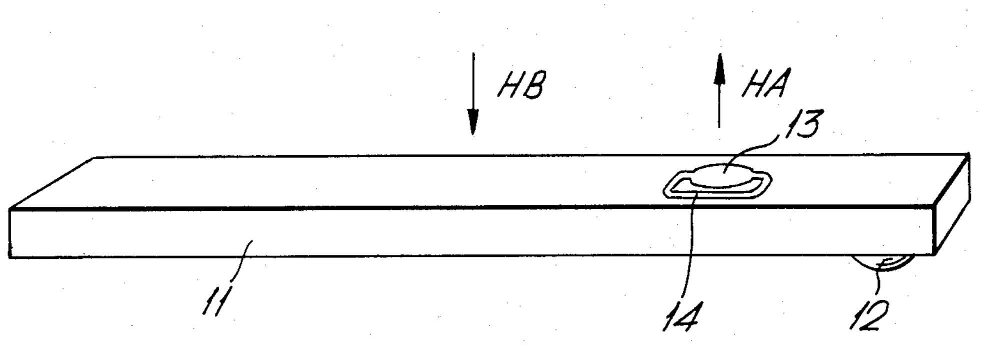
FIG. 1 is a schematic sectional view of the semiconductor contact unit.

Referring to FIG. 1, the contact unit is fabricated from a flexible semiconductor filament 11, one end of which carries contact 12. A pn junction 13 is defined in the semiconductor filament 11 near the contact 12 and is provided with a short circuit path 14. In the drawing this path is provided by a metallized region, but in some applications this short circuit may be provided by a heavily doped region in the semiconductor adjacent the junction 13. The junction region of the semiconductor filament 11 is constructed in a manner analogous to that of a junction solar cell or photo-diode. When electromagnetic radiation of a suitable wavelength is directed on to the junction, carriers are generated causing a current to flow across the junction and around the short circuit path 14. This current has an associated magnetic field HA directed along the axis of the current circulation loop. If an external magnetic field HB is then applied to the assembly, e.g. by means of a permanent magnet, the interaction of the two magnetic fields applies a corresponding force to the semiconductor filament causing it to bend in a direction determined by the mutual orientation of the two fields.

Various materials can be employed in the fabrication of the contact unit, but the preferred material is silicon. Silicon technology is well understood and the material can be readily obtained in filament form either by selective etching of single crystal material or in the form of single crystal whiskers. Silicon also has suitable photovoltaic properties for this purpose and the techniques involved in fabricating silicon photo-voltaic devices are well established.

Figure 2:
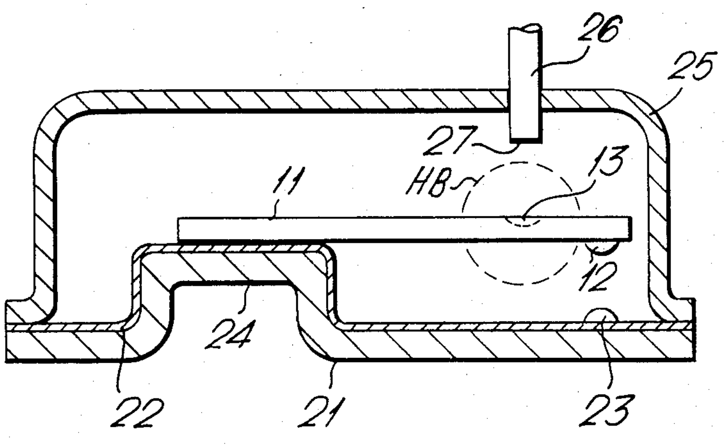
FIG. 2 is a schematic view of a switch device incorporating the contact unit of FIG. 1.

Referring now to FIG. 2, this shows in cross sectional view a switch device incorporating the contact unit of FIG. 1. The switch device includes a base plate 21 covered with an insulating layer 22 on which fixed contact 23 is deposited. The base plate 21 has a raised portion 24 to which one end of the semiconductor filament 11 is secured such that the contact 12 carried at the face end of the filament 11 are disposed above the fixed contact 23. For clarity the clearance between the contacts 12 and 23 has been shown somewhat exaggerated.

The filament 11 is disposed with its light sensitive junction 13 in a static magnetic field provided by one or more permanent magnets 24 mounted adjacent the filament. Advantageously these magnets are of the high-field rare earth type. These materials have a high coercivity and are particularly suitable for the construction of small high-strength permanent magnets.

The switch device is hermetically sealed with a cover 25 having an opening through which an optical fiber 26 is received. The end 27 of the fiber 26 is disposed adjacent the pn junction 13 such that light directed along the fiber impinges on the junction. In some applications, the fiber end may be provided with a lens termination to provide focusing of the light on to the junction.

When light is directed via the fiber 26 on to the junction 13 the magnetic field induced by the photo-generated short circuit current causes the filament 11 to bend towards the base plate 21 so that electrical connection is established between the contacts 23 and 12. When the light signal is terminated, the short circuit current ceases to flow and the filament returns to its original position thus opening the contacts.

In a further embodiment of the invention, a plurality of devices of the type shown in FIG. 1 are formed in a single semiconductor wafer by doping and selective etching such that each device is attached to the body of the wafer only at the end of the filament 11 remote from the contact 12. Suitable techniques for selectively etching semiconductor materials are described in our published U.S. Pat. No. 1,211,499. The wafer carrying the plurality of switch elements is mounted adjacent a static contact array whereby operation of any one or more switch elements provides contact to a corresponding static contact or contact between corresponding pairs of static contacts. The assembly may be provided with a housing whereby the contacts are protected from the risk of contamination. Such an arrangement is particularly suited to telecommunications switching applications as it provides a compact multi-contact switch array.

A variety of magnetic materials are available whereby the static magnetic field necessary for the operation of the switches described herein may be provided. We prefer to use magnetic materials containing rare earth metals as these materials permit the fabrication of physically small magnets with a high field strength and a high stability.

What is claimed is:

1. An opto-electrical contact unit, comprising:

a movable member carrying one or more contacts;

at least one contact disposed in registration with the contacts on the movable member;

a pn junction formed on said movable member;

a short circuit current loop connected across said pn junction;

means for providing a magnetic field in the region of said junction; and means for subjecting said junction to electromagnetic radiation, whereby said electromagnetic radiation causes the junction to induce a current circulating through said short circuit loop, said current forming a magnetic field which interacts with the first-mentioned magnetic field to cause the movable member to bend so that an electrical contact may be made between the contacts that are in registration with each other.

2. An opto-electrical switch device, comprising:

a housing;

a flexible semiconductor member mounted within the housing;

at least one contact mounted on said member;

a pn junction region formed in the semiconductor member;

a short circuit current loop formed across said junction;

at least one contact mounted in the housing in register with the contacts on said member;

means for providing a magnetic field at least in the region of said junction; and means for directing light on to said junction so that a current flows from the junction around the short circuit loop, and the magnetic field and the magnetic field associated with the short circuit current loop are mutually orientated such that said member is caused to bend, thereby making and/or breaking said contacts.

3. A switch device as claimed in claim 2, wherein the semiconductor is silicon.

4. A switch device as claimed in claim 3, wherein the flexible member is formed from a silicon whisker.

5. A contact unit as claimed in any one of claims 2, 3 or 4, wherein said magnetic field is provided by a permanent magnet associated with the switch device.

* * * * *